United States Patent [19]

Halm

[11] 4,193,885

[45] Mar. 18, 1980

[54] METHOD FOR PREPARING A THERMAL-STABILITY ADDITIVE AND A THERMALLY STABILIZED METHYLPOLYSILOXANE AND COMPOSITIONS THEREFROM

[75] Inventor: Roland L. Halm, Saginaw, Mich.

[73] Assignee: Dow Corning Corporation, Midland, Mich.

[21] Appl. No.: 910,706

[22] Filed: May 26, 1978

Related U.S. Application Data

[62] Division of Ser. No. 821,251, Aug. 2, 1977, Pat. No. 4,122,109.

[51] Int. Cl.$^2$ ............................................. C09K 50/00
[52] U.S. Cl. ............................. 252/78.3; 260/448.2 S
[58] Field of Search ................. 260/448.2 S; 252/78.3

[56] References Cited

U.S. PATENT DOCUMENTS

| | | | |
|---|---|---|---|
| 3,884,950 | 5/1975 | Koda et al. | 260/448.2 S |
| 4,070,343 | 1/1978 | Kishimoto et al. | 260/448.2 S X |

*Primary Examiner*—Paul F. Shaver
*Attorney, Agent, or Firm*—George A. Grindahl

[57] ABSTRACT

Endblocked methylpolysiloxane fluids, such as trimethylsiloxane-endblocked polydimethylsiloxanes, are made more resistant to thermally induced siloxane rearrangement by incorporating therein certain amounts of titanium-, zirconium-, or hafnium-containing compounds. Incorporation of these compounds may be accomplished either by mixing organosiloxy derivatives of Ti, Zr, or Hf with the fluid or by mixing certain organic derivatives of Ti, Zr, or Hf with the fluid and heating the mixture to decompose the added organic derivative. Furthermore, incorporation may be accomplished either by mixing the correct amount of the Ti, Zr, or Hf compound with the fluid or by mixing an excessive amount of the Ti, Zr, or Hf compound with the fluid to form a thermal-stability additive which may be diluted with additional fluid to achieve the correct amount of Ti, Zr, or Hf compound. Further improvements in the thermal stability of the fluid may be obtained by mixing with the titanium-, zirconium-, or hafnium-containing fluid a small amount of an organosilicon hydride compound. The thermally stabilized fluids are particularly useful as heat-transfer fluids in non-oxidative, anhydrous environments.

8 Claims, No Drawings

METHOD FOR PREPARING A THERMAL-STABILITY ADDITIVE AND A THERMALLY STABILIZED METHYLPOLYSILOXANE AND COMPOSITIONS THEREFROM

This is a division, of application Ser. No. 821,251, filed Aug. 2, 1977, now U.S. Pat. No. 4,122,109.

BACKGROUND OF THE INVENTION

This invention relates to a method for preparing endblocked methylpolysiloxane fluids having improved thermal stability and to the thermally improved methylpolysiloxane fluids obtained thereby. In one aspect this invention relates to a method for preparing a titanium-, zirconium-, or hafnium-containing methylpolysiloxane thermal-stability additive and to a method for stabilizing a methylpolysiloxane fluid therewith. In another aspect this invention relates to a heat-transfer system comprising an improved heat-transfer fluid.

Herein the general term "endblocked" refers to hydrocarbon endblocking groups such as methyl endblocks such as are present in trimethylsiloxane endblocks and does not include hydrolyzable endblocking groups such as hydroxy endblocks and alkoxy endblocks.

Although organopolysiloxanes, especially methylpolysiloxanes are well known for their thermal stability, considerable effort has been devoted by the prior art to obtaining improvements therein. Instability of organopolysiloxane at high temperature is related to reactions of the silicon-bonded organic radicals, such as cleavage and oxidation, which often lead to crosslinking and gelation of the organopolysiloxane; and to rearrangement reactions of siloxane linkages, which often leads to depolymerization of the siloxane and to the formation of lower molecular weight siloxanes. A large part of the prior art relates to stabilizing organopolysiloxanes to radical cleavage and oxidation at high temperature. This invention is related to a method of improving the stability of an endblocked methylpolysiloxane toward siloxane rearrangement at high temperature in the absence of more than trace amounts of moisture and to the compositions obtained therefrom.

Organopolysiloxanes are known to readily undergo siloxane rearrangement in the presence of acidic and alkaline catalysts to produce a different arrangement of siloxane linkages. For example, a trimethylsiloxane-endblocked polydimethylsiloxane will give rise to cyclopolydimethylsiloxanes such as the corresponding cyclotrisiloxane and cyclotetrasiloxane and to shorter chain trimethylsiloxane-endblocked polydimethylsiloxanes, including the shortest species, i.e. hexamethyldisiloxane, when heated in the presence of a rearranging catalyst such as sulfuric acid or sodium hydroxide.

Many organopolysiloxanes in which no catalyst has been intentionally added also undergo siloxane rearrangement to some extent at high temperature. This rearrangement is thought to be due to the presence of silanol in the siloxane. For example, Rode, et al., *Vysokomol. soyed. All:* No. 7, 1529-1538, 1969 have studied the thermal degradation and stabilization of polydimethylsiloxane in the absence of oxygen and have found that the rate of thermal degradation of a hydroxy-endblocked polydimethylsiloxane toward cyclotrisiloxane formation could be decreased by reacting the hydroxyl endgroups with acetylacetonates of copper, iron or zirconium in m-cresol. They have also found that the thermal stability of the hydroxy-endblocked polydimethylsiloxane fluids could be improved merely by adding thereto certain additives such as acetylacetonates of aluminum, zinc, cobalt, copper, iron, and zirconium and titanium-tetrabutoxylate; however, intensive crosslinking and gelation of the treated siloxane also occurred at low temperatures. Rode, et al. also noted that a trimethylsiloxane-endblocked polydimethylsiloxane also undergoes siloxane rearrangement to form the cyclotrisiloxane but they proposed no solution for this problem.

Britt, U.S. Pat. No. 3,759,970 stabilizes polysiloxane fluids by replacing impurity groups, such as SiCl, SiH, and SiOH with a fluoride group. Britt speaks to the problem of oxidative instability as evidenced by gelation of the polysiloxane fluid in the air at high temperature but states nothing about inhibiting siloxane rearrangement in the absence of air.

Organic titanium and zirconium compounds have found use in organopolysiloxane compositions. For example, Ceyzeriat, et al., U.S. Pat. No. 3,151,099 employ large amounts of titanium alkoxides or zirconium alkoxides as a component in a moisture-curing composition. Brown, et al., U.S. Pat. No. 3,745,129 use numerous siloxane organometallocene compounds to protect polydiorganosiloxane fluids against oxidation. Hunter, et al., U.S. Pat. No. 2,728,736 use large amounts of zirconium alkoxides in organopolysiloxane compositions which are suitable for treating leather. McNulty, et al., U.S. Pat. No. 2,687,388 use small amounts of a zirconium salt of an organic acid which is soluble in polyorganosiloxanes to function as a hardening agent for the polyorganosiloxane. Swiss, U.S. Pat. No. 2,465,296 uses minor amounts of certain metal chelates to stabilize organosilicon oxide polymers against oxidation at high temperatures. Swiss further teaches that the solution of metal chelate and organosilicon oxide polymer should be heated to 200°-250° C. to impart much better oxidation resistance to the composition. It is also known that certain cerium-containing heat-stability additives for organopolysiloxanes which have improved resistance to precipitation, can be prepared by reacting certain alkali metal siloxanolates with cerium salts and at least one organic carboxylic acid salt or alkoxy derivative of zirconium, titanium, or iron.

Thus, while the above prior art teaches that organic titanium or zirconium compounds may be used in organopolysiloxanes for many reasons, including stabilization of hydroxy-endblocked polydimethylsiloxanes toward siloxane rearrangement, nothing is taught therein regarding the stabilization of hydrocarbon-endblocked methylpolysiloxanes toward thermal siloxane rearrangement in the absence of moisture using only said titanium or zirconium compounds.

SUMMARY OF THE INVENTION

It has now been discovered that the rate of thermal siloxane rearrangement that is experienced by an endblocked methylpolysiloxane under anhydrous conditions may be reduced to a low level by incorporating in the methylpolysiloxane small amounts of certain titanium-, zirconium-, or hafnium-containing compounds.

It has further been discovered that said rate of thermal siloxane rearrangement may be further reduced and essentially eliminated by mixing an organosilicon hydride compound with the methylpolysiloxane having incorporated therein said titanium-, zirconium-, or hafnium-containing compounds.

It is an object of this invention to provide a method for improving the stability of endblocked methylpolysiloxanes against siloxane rearrangement at high temperature in an inert atmosphere.

It is another object of this invention to provide a method for preparing a titanium-, zirconium-, or hafnium-containing thermal-stability additive for reducing siloxane rearrangement of methylpolysiloxanes.

It is another object of this invention to provide a method for essentially eliminating the thermally induced siloxane rearrangement of timethylsiloxane-endblocked polydimethylsiloxanes.

It is also an object of this invention to provide methylpolysiloxane fluids which have improved stability toward siloxane rearrangement.

It is a further object of this invention to provide a thermal-stability additive for methylpolysiloxane fluids.

It is a further object of this invention to provide an improved heat-transfer system.

These and other objects are achieved by the method of this invention, the resulting compositions and their use in a heat-transfer system which method, briefly stated, comprises preparing a metal-containing methylpolysiloxane wherein the metal is titanium, zirconium, or hafnium and using it as a heat-transfer fluid.

The metal-containing methylpolysiloxane may be prepared by mixing certain siloxy-titanium, -zirconium, or -hafnium compound with a methylpolysiloxane or by mixing certain organo-titanium, -zirconium, or -hafnium compounds with a methylpolysiloxane and heating the resulting mixture. The heating is conducted in an inert atmosphere at a temperature sufficient to decompose the organo-titanium, -zirconium, or -hafnium compound.

The resulting metal-containing methylpolysiloxane possesses increased resistance to siloxane rearrangement under anhydrous conditions at high temperature if its metal content has a value of from 0.001 to 0.1 weight percent. Metal-containing methylpolysiloxanes which bear more than 0.1 weight percent metal are thermal-stability additives and may be mixed with additional endblocked methylpolysiloxane to attain the desired stabilizing metal concentration stated above.

While not wishing to limit this invention by theory, it is theorized that metal-oxygen-silicon bonds, either added as the siloxy-metal compound or formed during the heating step of the above method, serve to inactivate or attenuate certain active hydrogen atoms, such as in $\equiv$SiOH, which are present in trace amounts in the endblocked methylpolysiloxane and which cause siloxane rearrangement at high temperature if not activated or removed. It is to be understood that the metal-containing methylpolysiloxane prepared from the siloxy-metal compounds may or may not have the same type of metal-oxygen-silicon bonding structure as the metal-containing methylpolysiloxane prepared from the organo-metallic compounds.

For further improvements in resistance to siloxane rearrangement on organosilicon hydride compound may be mixed with the metal-containing methylpolysiloxane which has from 0.001 to 0.1 percent by weight metal. It is theorized that the silicon-bonded hydrogen atoms of the organosilicon hydride compound react with the inactivated or attenuated hydrogen atoms in the metal-containing methylpolysiloxane to remove them from the composition.

DESCRIPTION OF THE INVENTION

This invention relates to a method for preparing a methylpolysiloxane thermal-stability additive, and to the thermal-stability additive resulting therefrom, said method comprising mixing components consisting essentially of (i) an endblocked methylpolysiloxane fluid having an average of from 1.9 to less than 3.0 methyl groups per silicon and either (ii) an organometallic compound in sufficient amount to provide from more than 0.1 to 10.0 parts by weight of the metal per 100 parts by weight of the mixture of (i) plus (ii), or (v) a siloxy-metal compound in sufficient amount to provide more than 0.1 parts by weight of the metal per 100 parts by weight of the mixture of (i) plus (v); said organometallic compound being selected from the group consisting of organotitanium, organozirconium, and organohafnium compounds wherein each organic group consists of carbon, oxygen and hydrogen atoms and which is bonded to the metal by at least one metal-oxygen-carbon linkage, and said siloxy-metal compounds being selected from the group consisting of organosilicon compounds having at least one silicon-oxygen-titanium, silicon-oxygen-zirconium, or silicon-oxygen-hafnium bond and heating the mixture of (i) plus (ii) in an inert atmosphere to decompose the organometallic compound.

This invention further relates to a method for preparing a methylpolysiloxane fluid and to the fluid resulting therefrom having improved resistance to thermal siloxane rearrangement, said method comprising (A) mixing components consisting essentially of (i) an endblocked methylpolysiloxane fluid having an average of from approximately 1.9 to less than 3.0 methyl groups per silicon, and (ii) an organometallic compound in sufficient amount to provide from 0.001 to 10 parts by weight of the metal per 100 parts by weight of the mixture of (i) plus (ii), said organometallic compound being selected from the group consisting of organotitanium, organozirconium, and organohafnium compounds wherein each organic group consists of carbon, oxygen and hydrogen atoms and which is bonded to the metal by at least one metal-oxygen-carbon linkage, (B) heating the mixture of (A) in an inert atmosphere to decompose the organometallic compound, (C) mixing with the mixture of (B), (iii) an amount of the endblocked methylpolysiloxane (i), said amount being any amount, including none, which is sufficient to reduce the concentration of the metal to a value of from 0.001 to 0.1 parts by weight per 100 parts by weight of the mixture of (C), and (D) mixing with the mixture of (C), (iv) an organosilicon hydride compound, soluble in (i) and bearing at least one silicon-bonded hydrogen atom per molecule, the amount of (iv) being from none to an amount sufficient to provide up to 0.05 parts by weight of silicon-bonded hydrogen atoms per 100 parts by weight of the mixture of (C), thereby providing a methylpolysiloxane fluid having an improved resistance to thermal siloxane rearrangement under anhydrous conditions compared to the methylpolysiloxane (i).

This invention further relates to a method for preparing a methylpolysiloxane fluid and to the fluid resulting therefrom having improved resistance to thermal siloxane rearrangement, said method comprising mixing components consisting essentially of (i) an endblocked methylpolysiloxane fluid having an average of from approximately 1.9 to less than 3.0 methyl groups per silicon, (v) a siloxy-metal compound in sufficient amount to provide from 0.001 to 0.1 parts by weight of the metal per 100 parts by weight of the mixture of (i) plus (v), said siloxy-metal compound being selected from the group consisting of organosilicon compounds having at least one silicon-oxygen-titanium, silicon-oxygen-zirconium or silicon-oxygen-hafnium bond, and (iv) an organosilicon hydride compound, soluble in (i) and bearing at least one silicon-bonded hydrogen atom per molecule, the amount of (iv) being from none to an amount sufficient to provide up to 0.05 parts by weight of silicon-bonded hydrogen atoms per 100 parts by weight of the mixture of (i) plus (v), thereby providing a methylpolysiloxane fluid having an improved resistance to thermal siloxane rearrangement under anhydrous conditions, compared to the methylpolysiloxane (i).

This invention further relates to an improved heat-transfer system comprising a heat source, a heat exchanger, a heat-transfer fluid and means for conveying the heat-transfer fluid between the heat source and the heat exchanger whereby heat is added to the heat-transfer fluid by the heat source and at least partially removed from the heat-transfer fluid by the heat-exchanger, the improvement comprising using as the heat-transfer fluid the improved methylpolysiloxane fluid of this invention.

It is to be understood that the method of this invention comprises preparing a thermally stabilized metal-containing methylpolysiloxane having the desired metal concentration within the range of from 0.001 to 0.1 weight percent or preparing a thermal-stability additive, which contains more than 0.1 weight percent of the metal, which may be mixed with additional methylpolysiloxane (iii) to lower the concentration of the metal to a value of from 0.001 to 0.1 percent by weight. Said additional methylpolysiloxane (iii) may be merely additional quantities of the methylpolysiloxane (i) that was used to prepare the additive or (iii) may be another methylpolysiloxane (i) such as one having a different viscosity or different siloxane unit content.

The endblocked methylpolysiloxane fluids (i) to be used in the method of this invention consists essentially of siloxane units selected from the group consisting of $(CH_3)_3SiO_{1/2}$, $(CH_3)_2SiO_{2/2}$, $CH_3SiO_{3/2}$ and $SiO_{4/2}$. The total number of each siloxane unit in (i) is such that the average number of methyl groups per silicon in the methylpolysiloxane has a value of from approximately 1.9 to less than 3. Generally there is a majority of $(CH_3)_3SiO_{1/2}$ and/or $(CH_3)_2SiO_{2/2}$ siloxane units in (i). Preferably methylpolysiloxane (i) contains at least 90 mol percent of $(CH_3)_3SiO_{1/2}$ units and $(CH_3)_2SiO_{2/2}$ units and no more than 10 mol percent of $CH_3SiO_{3/2}$ units and $SiO_{4/2}$ units. Most preferably methylpolysiloxane (i) is essentially free of $CH_3SiO_{3/2}$ units and $SiO_{4/2}$ units.

Exemplary of preferred endblocked methylpolysiloxanes (i) are linear trimethylsiloxane-endblocked polydimethylsiloxane fluids having the formula $(CH_3)_3SiO\{(CH_3)_2SiO\}_xSi(CH_3)_3$ wherein x has an average value greater than zero, such as 1, 3, 7, 10, 20, 30, 50, 100, 200, 500, 1000, 2000 and more. Linear endblocked methylpolysiloxane fluids are well known in the polymer art and are commercially available in a wide variety of viscosities extending from mobile liquids to slowly flowing gums. They may be prepared by methods well known in the art. Trace amounts of branching siloxane units such as $CH_3SiO_{3/2}$ and $SiO_{4/2}$ units may be present in said linear fluids as impurities.

Further examples of endblocked methylpolysiloxanes (i) are branched fluids which contain more than trace amounts of $CH_3SiO_{3/2}$ and $SiO_{4/2}$ siloxane units such as methylpolysiloxanes of known, simple structure such as $\{(CH_3)_3SiO\}_3SiCH_3$ and $\{(CH_3)_3SiO\}_4Si$ and more complex siloxanes frequently having an unknown structure, which are conveniently described by the general formula $\{(CH_3)_3SiO_{1/2}\}_m\{(CH_3)_2SiO_{2/2}\}_n\{CH_3SiO_{3/2}\}_p\{SiO_{4/2}\}_q$ wherein m, n, p, and q denote mol percents of the indicated siloxane unit and whose total is 100 mol percent. As noted above the sum of m plus n generally totals more than 50 and preferably at least 90 mol percent. Branched methylpolysiloxane fluids may be prepared by any suitable method which will provide essentially completely endblocked fluids which are essentially free of silicon-bonded hydrolyzable groups such as hydroxyl. Typically, branched fluids may be prepared by cohydrolysis of suitable amounts of the appropriate hydrolyzable silanes such as chlorosilanes and/or alkoxysilanes such as $(CH_3)_3SiCl$, $(CH_3)_3SiOCH_3$ and $(CH_3)_2Si(OCH_3)_2$, and condensation of the resulting silanols in the well-known manner.

Endblocked methylpolysiloxane fluids, as prepared, frequently contain low molecular weight siloxanes such as $\{(CH_3)_3Si\}_2O$ and cyclopolysiloxanes of the formula $\{(CH_3)_2SiO\}_{3 \text{ to } 10}$ which may or may not be removed from the fluid as desired. In any case the endblocked methylpolysiloxane fluids, particularly the higher molecular weight fluids which are more likely to contain trace amounts of catalytic species such as silanol, undergo siloxane rearrangement reactions at high temperature to produce additional quantities of said lower molecular weight species. This rearrangement is of particular concern with certain fluids such as the trimethylsiloxane-endblocked polydimethylsiloxane linear fluids, hereinbefore exemplified, having a viscosity of from 10 to 100 millipascal-seconds at 25° C. These fluids are of particular value as a heat-transfer medium, in which use they are frequently exposed to temperatures exceeding 300° C. In such a use it is preferable to remove, and to prevent the further formation of, said low molecular weight siloxanes from the fluid to avoid the generation of high pressures in a closed system or the loss of fluid from an open system arising from the high volatility of the low molecular weight siloxanes. The method of this invention greatly reduces and, in certain instances, essentially stops this formation of low molecular weight siloxanes.

While the endblocked methylpolysiloxane fluid (i) consists essentially of siloxane units bearing only methyl groups it is within the scope and spirit of this invention to permit up to one mol percent of said methyl groups in (i) to be replaced by other hydrocarbon groups such as phenyl, vinyl, and ethyl, particularly in the endblocking groups.

The viscosity of the endblocked methylpolysiloxane (i) is not critical and may have any value. Low viscosity methylpolysiloxane fluids, e.g. up to 10 pascal-seconds are relatively easy to handle in such operations as pouring, piping, mixing and stirring, but very low viscosity fluids, e.g. up to 10 millipascal-seconds may have low boiling points which may make pressure equipment necessary for their containment during heating operations. Higher viscosity methylpolysiloxane liquids e.g. from 10 to 100 pascal-seconds, and gums, e.g. from 0.1 to 10 kilopascal-seconds may be more difficult to handle but may not require pressure equipment during heating operations because of their higher or non-existent boiling points. The method and compositions of this invention are operative for all viscosities of (i).

By fluid it is meant herein a substance which is flowable at room temperature. Of course, liquid fluids flow rapidly; however, gum fluids may require from several minutes to several hours to experience flow.

The organometallic compounds (ii) and the siloxy-metal compounds (v) which are mixed with the methylpolysiloxane (i) are derivatives of the Group 4A metals in the periodic chart of the elements, i.e. titanium, zirconium and hafnium. While derivatives of each element are effective in the method of this invention, the derivatives of zirconium and hafnium are preferred because they are less volatile and less susceptible to hydrolysis than are the corresponding derivatives of titanium.

It is well known that zirconium and hafnium are essentially identical in their chemical behavior and that all zirconium in nature contains small portions of hafnium. For these reasons it is to be understood that the use of the word zirconium herein is to be taken as referring optionally to zirconium, free of hafnium, or to zirconium mixed with minor amounts of hafnium. In like manner the use of the word hafnium herein is to be taken as referring optionally to hafnium, free of zirconium, or to hafnium mixed with minor amounts of zirconium.

The organometallic compounds (ii) bear organic radicals which contain atoms of carbon, hydrogen and oxygen and which are bonded to the metal atoms by way of one or more metal-oxygen-carbon linkages. Examples of suitable organic radicals which are so bonded include the carboxylates such as propionate, butyrate, crotonate, octanoate, laurate, naphthenate, the benzoate; the hydrocarbonoxides such as ethoxide, propoxide, butoxide, and phenoxide, giving rise to compounds otherwise known as esters such as tetraethyltitanate and tetrabutylzirconate; the enolates such as the acetonates; and chelates such as acetylacetonates, succinates, phthalates and maleates. Preferably the organometallic compound is soluble in the methylpolysiloxane (i), although this is not necessary.

A preferred and readily available class of organometallic compounds (ii) is the zirconium soaps which are longer-chain monocarboxylic acid derivatives of zirconium such as zirconium octanoate which is well known as a drier in paint formulations.

The organozirconium compounds and organotitanium compounds are well-known in the paint and polymer art as curing agents and catalysts; many are commercially available. Information relating to the preparation of suitable organozirconium compounds and organohafnium compounds may be found in "The Chemical Behavior of Zirconium," by Warren B. Blumenthal, D. Van Nostrand Company, New York, 1958, Chapters 8 and 9 which is hereby incorporated herein by reference.

The siloxy-metal compounds (v) are organosilicon compounds which have at least one siloxy-metal bond, i.e. at least one silicon-oxygen-titanium, silicon-oxygen-zirconium or silicon-oxygen-hafnium bond per molecule and which are soluble in the methylpolysiloxane (i). Preferably the siloxy-metal compound is non-volatile at room temperature and most preferably it is non-volatile at the maximum use temperature of the thermally stabilized fluid.

The silicon-bonded groups in (v) may be monovalent hydrocarbon radicals such as aliphatic radicals such as methyl, ethyl, isopropyl, vinyl, allyl, benzyl, and cyclohexyl, and aromatic radicals such as phenyl, tolyl and xenyl; and polyvalent hydrocarbon radicals such as alkylene radicals such as methylene, ethylene, propylene, butylene, and cyclohexylene and arylene radicals such as phenylene and xenylene. Polyvalent hydrocarbon radicals may be joined to the same or different silicon atoms in the molecule. Any silicon valences in (v) which are not satisfied by an oxygen-metal bond or by said hydrocarbon radicals are satisfied by divalent oxygen atoms which join silicon atoms to form siloxane linkages.

The titanium, zirconium or hafnium atoms in the siloxy-metal compounds (v) have at least one organosiloxy group bonded thereto and may have only organosiloxy groups bonded thereto. Any Ti, Zr, or Hf valences of the siloxy-metal compounds (v) which are not satisfied by siloxy groups are satisfied by oxygen atoms, either singly or joined to other Ti, Zr, or Hf atoms, or by oxygen-bonded organic radicals such as are present in the organometallic compound (ii) above.

One type of siloxy-metal compounds (v) are the polydimethylsiloxy-metal compounds of the general formula $(-O\{(CH_3)_2SiO\}_y)_4M$ wherein M denotes Ti, Zr, or Hf, y is an integer greater than zero and the undesignated oxygen valence may be satisfied by an endblocking radical such as trimethylsiloxy or by an M atom. Examples of these siloxy-metal compounds and references describing their preparation are listed in the Pode, et al., reference listed hereinabove.

Another type of siloxy-metal compounds (v) are the tetrakistrimethylsiloxy-metal compounds having the formula $\{(CH_3)_3SiO\}_4M$ where M denotes Ti, Zr, or Hf. It is to be understood that, in view of the propensity of M to coordinate, as well as to bond, with oxygen atoms, the above formula for (v) is to be taken as referring to the monomeric tetrakistrimethylsiloxy-metal compound and to any coordinated polymeric compound having the above formula as a monomeric repeating unit. Furthermore, in view of the ready hydrolysis of the tetrakistrimethylsiloxy metal compounds, there may be present in (v) small amounts of partially hydrolyzed and condensed molecules bearing less than 4 trimethylsiloxy groups per M. The extent of said hydrolysis and condensation should not be so great as to render the siloxy-metal compound (v) insoluble in the methylpolysiloxane (i).

The amount of organometallic compound (ii) or siloxy-metal compound (v) to be mixed with the endblocked methylpolysiloxane (i) to provide improved thermal stability is that amount that will provide from 0.001 to 0.1 parts by weight of the metal for every 100 parts by weight of the mixture of (i) plus (ii) or the mixture of (i) plus (v).

When th organometallic compound (ii) is used in the method of this invention, thereby requiring a heating step to decompose the organometallic compound, it is convenient to admix excess organometallic compound (ii) with (i) and to heat the mixture to form a metal-rich thermal-stability additive having more than 0.1 weight percent of metal, which may be shipped and/or stored and may subsequently be admixed with additional quantities of (i). However, in order to avoid degradation of (i) during the heating step the organometallic compound should not provide more than 10, preferably not more than 5 weight percent of the metal in the mixture to be heated.

When the siloxy-metal compound (v) is used in the method of this invention it may also be admixed in excess with (i) to form a metal-rich thermal-stability additive having more than 0.1 weight percent metal, which may be shipped and/or stored and may subsequently be admixed with additional quantities of (i). In this case, however, the concentration of metal in the additive may exceed 10 weight percent, if desired, since no heating step to decompose the siloxy-metal compound, is required as with the thermal stability additives prepared from organometallic compound (ii). Said subsequent dilution of either thermal-stability additive should use a sufficient amount of (i) to reduce the metal concentration to a value of from 0.001 to 0.1 weight percent, as noted above, to provide a methylpolysiloxane having improved stability to siloxane rearrangement.

In the method of this invention the desired amount of the organometallic compound (ii) or the siloxy-metal compound (v) is mixed with an appropriate amount of the endblocked methylpolysiloxane (i) in any suitable manner to provide an essentially homogeneous mixture. Solvents, heat, shearing and the like may be used in the well-known manner to aid in mixing. Any solvents should be unreactive with (i) or (ii) and are preferably removed from the mixture prior to thermally decomposing the organometallic compound (ii).

Thermal decomposition of the organometallic compound (ii) is done by heating the mixture of (ii) in (i) in an inert atmosphere under suitable conditions of time and temperature. By an inert atmosphere it is meant an environment such as a vacuum or a nitrogen blanket or purge which will not react with the components of said mixture at the temperature that is used to decompose the organometallic compound. Conditions of time and temperature which are suitable for decomposing the organometallic compound will vary, depending upon the particular organometallic compound that is used, and are impossible to predict with accuracy. They should be determined for any particular combination of (i) and (ii) by simple experimentation. For example, the mixture of (i) plus (ii) may be heated in a closed, inerted system equipped with a means for measuring system pressure. A temperature at which an increase of pressure with time is noticed in the system in indicative of a suitable decomposition temperature for the purposes of this invention. Alternately, the particular organometallic compound (ii) to be used in the method of this invention may be subjected to thermogravimetric analysis or differential thermal analysis in an inert atmosphere to determine a decomposition temperature that may be used in the method of this invention. As a limiting example, the mixture of (i) plus (ii) may be heated to a temperature approaching, but not reaching, the thermal decomposition temperature of the methylpolysiloxane (i) for a period of from 6 to 24 hours. Preferably, the decomposition of the organometallic compound should be essentially complete, thereby providing a thermally stabilized fluid or a thermal-stability additive that may be used at elevated temperatures without experiencing additional decomposition.

In the method of this invention any volatile and/or insoluble decomposition products such as $CO_2$, hydrocarbons, acids and alcohols are preferably removed before the stabilized methylpolysiloxane fluid is used in a high-temperature application. Most preferably said decomposition products are removed while they are being formed in the heating step or shortly thereafter. Decomposition products may be removed by any suitable method such as distillation, evaporation, filtration, centrifugation, decantation and absorption.

The metal-containing methylpolysiloxane should be kept under anhydrous conditions. Preferably the method of this invention should be conducted entirely under anhydrous conditions and the resulting compositions should be stored and used under anhydrous conditions.

The method of this invention further comprises mixing an organosilicon hydride compound (iv) with a thermally stabilized methylpolysiloxane of this invention. This use of an organosilicon hydride compound (iv) in the method of this invention is optional. A methylpolysiloxane fluid having improved resistance to siloxane rearrangement at elevated temperature will be obtained if (iv) is omitted from said method; however, even greater improvement in resistance to siloxane rearrangement can be achieved by its use in said method.

The organosilicon hydride compound (iv) should not be added to a metal-containing methylpolysiloxane of this invention which contains more than 0.1 weight percent metal, i.e. a thermal-stability additive of this invention, since the loss of silicon-bonded hydrogen and the release of hydrogen gas may occur, particularly in the presence of moisture. The organosilicon hydride compound (iv) is preferably mixed with the thermally stable methylpolysiloxane containing from 0.001 to 0.1 weight percent metal or with the additional methylpolysiloxane (i) that is mixed with a thermal-stability additive of this invention.

The organosilicon hydride compound (iv) may be any silane, siloxane or silcarbane which bears at least one silicon-bonded hydrogen atom per molecule and which is soluble in the methylpolysiloxane (i). Preferably the organosilicon hydride is not gaseous at room temperature.

The organic groups in (iv) may be monovalent hydrocarbon radicals such as aliphatic radicals such as methyl, ethyl, isopropyl, vinyl, allyl, benzyl, and cyclohexyl and aromatic radicals such as phenyl, tolyl and xenyl; and polyvalent hydrocarbon radicals such as alkylene radicals such as methylene, ethylene, propylene, butylene, and cyclohexylene and arylene radicals such as phenylene and xenylene. Polyvalent hydrocarbon radicals may be joined to the same or different silicon atoms in the molecule. Any silicon valences in (iv) which are not satisfied by hydrogen or by said hydrocarbon radicals are satisfied by divalent oxygen atoms which join silicon atoms to form siloxane linkages. The organosilicon hydride compound (iv) is essentially free of hydrolyzable radicals such as hydroxyl, alkoxy, and halogen. For maximum thermal stability, the organohydrogen silicon compound (iv) bears only silicon-bonded methyl, hydrogen and divalent oxygen radicals.

Examples of organosilicon hydride compound (iv) include silanes such as $C_6H_5(CH_3)_2SiH$, $CH_3(C_6H_5)_2SiH$ and

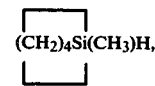
(CH$_2$)$_4$Si(CH$_3$)H, silcarbanes such as $H(CH_3)_2SiCH_2CH_2Si(CH_3)_2H$ and $C_6H_3\{Si(CH_3)_2H\}_3$ and siloxanes such as $CH_3\{(CH_3)_2SiO\}_3Si(CH_3)_2H$, $Si\{OSi(CH_3)_2H\}_4$, $Si\{OSi(CH_3)(C_6H_4)H\}_4$, $C_6H_5Si\{OSi(CH_3)_2H\}_3$, H(CH$_3$)SiO$_4$, H(CH$_3$)$_2$SiO{H(CH$_3$)SiO}$_{30}$Si(CH$_3$)$_2$H and (CH$_3$)$_3$SiO{(CH$_3$)$_2$SiO}$_2${H(CH$_3$)SiO}$_5$Si(CH$_3$)$_3$.

A trimethylsiloxane-endblocked polymethylhydrogensiloxane is preferred as organosilicon hydride compound (iv) because it is a relatively rich source of silicon-bonded hydrogen and can be made in various viscosities. Such a source of silicon-bonded hydrogen will provide the desired amount of hydrogen from a relatively small amount of (iv) and will also permit the matching of the viscosities of the methylpolysiloxane (i) and the organosilicon hydride compound (iv), if desired.

The amount of (iv) to be used in the method of this invention to achieve noticeable improvement in thermal stability is any amount sufficient to provide up to 0.05 parts by weight of silicon-bonded hydrogen for every 100 parts by weight of the thermally stabilized methylpolysiloxane containing from 0.001 to 0.1 percent by weight of metal. However, the amount (iv) added should not be so great as to form gel structure in the composition. The amount of improvement in thermal stability will vary directly with the amount of (iv) that is used. Optimum improvement in thermal stability may be obtained by using sufficient (iv) to provide at least approximately one silicon-bonded hydrogen from (iv) for every active hydrogen atom, such as SiOH, in the methylpolysiloxane (i) to be stabilized. The number of said active hydrogens in the methylpolysiloxane (i) may be determined by any suitable analytical method. Particularly suitable analytical methods for determining active hydrogen may be found in "Analysis of Silicones" by A. Lee Smith, Ed. John Wiley and Sons, Inc., NY, p. 136–138, which is hereby incorporated herein by reference.

The methylpolysiloxane fluids that are prepared by the method of this invention are useful as non-curing heat-transfer fluids in high-temperature, non-oxidative essentially anhydrous environments. Conventional additives for heat-transfer fluids such as lubricants, and antiwear additives may be mixed with the thermally stabilized fluids of this invention, if desired. In particular, antioxidants may be mixed with said fluids to extend their usefulness to oxygen-containing environments.

The high-temperature, non-oxidative, essentially anhydrous environments noted above may be of the closed or open type. An environment is open if volatile materials can exit therefrom even though the environment is maintained non-oxidative and anhydrous. An example of an open environment is the confined space of a nitrogen-purged, vented system. An environment is closed when volatile materials can neither exit therefrom nor enter therein.

In the practice of this invention a thermally stabilized methylpolysiloxane may be prepared directly from the appropriate amounts of methylpolysiloxane (i) and organometallic compound (ii) or siloxy-metal compound (v). Alternately the thermally stabilized methylpolysiloxane may be prepared indirectly by mixing a previously prepared thermal-stability additive of this invention with an appropriate amount of a methylpolysiloxane (i).

It is to be understood that a thermal-stability additive or a thermally stabilized methylpolysiloxane of this invention may be prepared and then placed in the environment of intended use; however, it is also within the spirit and scope of this invention to prepare said thermal-stability additive or said thermally stabilized methylpolysiloxane in situ, i.e. in the environment of intended use. For example, a thermally stabilized fluid of this invention may be prepared, directly or indirectly as noted above, and then placed and used as a heat-transfer fluid in a system, either open or closed, comprising a heat source, such as a solar collector, an electric heater and a flame, a heat exchanger and accompanying components. Alternately, in the in situ process, a methylpolysiloxane fluid (i) may be placed in said system and an appropriate amount of organometallic compound (ii) or siloxy-metal compound (v) subsequently admixed with the methylpolysiloxane (i); or a mixture of methylpolysiloxane (i) and organometallic compound (ii) or siloxy-metal compound (v) may be prepared and placed in said system. Decomposition of the organometallic compound (ii) may be then accomplished in said system. When using the in situ process it is preferred to remove any volatile decomposition products from the system before the thermally stabilized methylpolysiloxane fluid is used as the heat-transfer fluid. In any case, any organosilicon hydride compound (iv), may be added to the thermally stabilized methylpolysiloxane at the proper time as described hereinabove.

It is believed at this time that the best way to practice this invention is to prepare a methylpolysiloxane thermal-stability additive by mixing sufficient zirconium octanoate with a trimethylsiloxane-endblocked polydimethylsiloxane fluid to provide approximately 3 percent by weight of zirconium in the mixture and heating the resulting mixture under a nitrogen blanket for at least 6 hours at 350° C. The resulting fluid, after being freed of gaseous and solid materials, may be subsequently mixed with a methylpolysiloxane to be thermally stabilized so that the zirconium concentration is decreased to a value of from 0.015 to 0.030 percent by weight. The resulting thermally stabilized methylpolysiloxane may be used in a high-temperature, non-oxidizing, essentially anhydrous environment without experiencing siloxane rearrangement and the attendant formation of low molecular weight siloxane to the extent experienced by the zirconium-free methylpolysiloxane in the same environment.

To achieve further resistance to siloxane rearrangement the above thermally stabilized methylpolysiloxane may be mixed with an equivalent amount of a trimethylsiloxane-endblocked polymethylhydrogensiloxane fluid. By an equivalent amount it is meant an amount that will provide approximately one silicon-bonded hydrogen up to 0.05 parts by weight, for every active hydrogen in the mixture of thermal stability additive plus methylpolysiloxane.

It is preferred that the thermal-stability additive and its mixture with methylpolysiloxane and its mixture with methylpolysiloxane plus polymethylhydrogensiloxane be maintained anhydrous in order to preserve their full effectivness as a thermal-stability additive and thermally improved siloxanes. However, trace amounts of moisture e.g. up to 10 parts by weight water per million parts of the fluid may be absorbed by the fluid without adversely affecting its stability toward rearrangement.

The following examples are included by way of illustrating and not by way of limiting the invention which is properly delineated by the appended claims. All parts and percentages are by weight unless otherwise stated. Viscosities were measured in centipoise and were converted to pascal-seconds (Pa.s) by multiplying by 0.001. Pressures were measured in millimeters of mercury and were converted to pascal (Pa) by multiplying by 133.3224 and rounding off.

EXAMPLE 1

Four parts of a solution of zirconium octanoate in mineral spirits, containing 6 percent zirconium, was placed in a reaction vessel and stripped of 2.64 parts of mineral spirits at 120° C. and 6.67 kPa pressure and the residue was cooled. Then 7.55 parts of a trimethylsiloxane-endblocked polydimethylsiloxane fluid having a viscosity of approximately 20 mPa.s at 25° C. was mixed with one part of the cooled residue. The reaction vessel was purged with nitrogen, then sealed and the mixture was heated to 350° C. for 24 hours. The pressure in the reaction vessel was noted to increase for 24 hours. The hot reaction vessel was then vented slowly to atmospheric pressure to remove gaseous decomposition products and the product, 6.59 parts, was cooled to room temperature and filtered under a nitrogen atmosphere. The resulting product, 5.96 parts, was a clear, dark brown thermal-stability additive containing approximately 3.1 percent zirconium, according to elemental analysis.

EXAMPLE 2

A trimethylsiloxane-endblocked polydimethylsiloxane fluid having a viscosity of 10 Pa.s at 25° C. was analyzed with thermogravimetric analysis by heating the fluid from room temperature in a nitrogen atmosphere at 2° C./minute using a nitrogen flow of 200 cc/min. The temperatures at which 10 percent, 50 percent and 90 percent weight loss occurred were 415° C., 467° C., and 503° C. respectively. The analysis was repeated on another portion of the fluid except that the thermal-stability additive of Example 1 was added in an amount sufficient to provide a zirconium content of 0.02 percent. The resulting composition of this invention had weight losses of 10 percent at 493° C., 50 percent at 581° C. and 90 percent at 628° C., thereby showing the improvement in thermal stability that is realized by the method of this invention. This is an example of a thermally stabilized methylpolysiloxane fluid in an open system.

EXAMPLE 3

The trimethylsiloxane-endblocked polydimethylsiloxane fluid of Example 2 was mixed with the following organometallic compounds, siloxy-metal compounds and thermal-stability additives of this invention in sufficient quantity to provide 0.02 percent of the Group 4A metal: (1) A thermal stability additive prepared from tetrakis-(2-ethylhexyl)titanate (2.25 percent Ti) as in Example 1; (2) Tetrakis(2-ethylhexyl)titanate; (3) Tetrakis(trimethylsiloxy)zirconium; (4) Zirconium octanoate (6 percent Zr) in mineral spirits; (5) Iron octanoate (for comparison); (6) Zirconium acetylacetonate; (7) Zirconium octanoate additive (3.1 percent Zr) of Example 1; (8) A thermal stability additive prepared from hafnium octanoate (0.5 percent Hf) as in Example 1. The resulting mixtures were evaluated for improved thermal stability using thermogravimetric analysis (T.G.A.) as in Example 2. The results are summarized in Table I and, except for the control fluid, are arranged in order of increasing 10 percent weight loss temperature.

Significantly better overall results (10, 50, and 90 percent weight loss) were obtained from compositions prepared from thermal-stability additives, i.e. (1), (7), and (8). All compounds except zirconium acetylacetonate were soluble in the fluid. Compounds (2), (4), and (6) were thermally decomposed during the T.G.A. analysis thereby forming a thermally stabilized methylpolysiloxane of this invention.

TABLE I

| Group 4A Metal | T.G.A. Weight Loss Temperature (°C.) | | |
|---|---|---|---|
| (compound) | 10% | 50% | 90% |
| None | 415 | 467 | 503 |
| Ti(1)* | 405 | 582 | 625 |
| Ti(2) | 410 | 460 | 522 |
| Zr(3) | 427 | 546 | 588 |
| Zr(4) | 442 | 504 | 561 |
| Fe(5)** | 455 | 541 | 585 |
| Zr(6) | 476 | 592 | 641 |
| Zr(7) | 478 | 576 | 621 |
| Hf(8) | 482 | 570 | 612 |

*0.01 percent Ti instead of 0.02 percent.
**For comparative purposes only.

EXAMPLE 4

A trimethylsiloxane-endblocked polydimethylsiloxane fluid having a viscosity of 10 mPa.s at 25° C. was analyzed by gas-liquid chromatography (G.L.C.) to determine the total amount of cyclopolydimethylsiloxanes in the fluid. The fluid was then heated for 25 hours, 100 hours, and 400 hours at 350° C. in sealed stainless steel tubes. The tubes were cooled, opened and the contents were re-examined as above to determine the new cyclopolydimethylsiloxane content. An increase in the percent by weight of cyclopolydimethylsiloxanes was noticed in each case.

The experiment was repeated with the following compositions of this invention based on the above 10 mPa.s fluid: (9.) Fluid+0.75 percent of the zirconium octanoate additive of Example 1, (10.) Fluid+0.75 percent of tetrakis(trimethylsiloxy)zirconium, (11.) Composition (9.)+trimethylsiloxane-endblocked polymethylhydrogensiloxane, (12.) Composition (9.)+hexamethylethylhydrocyclotetrasiloxane, (13.) Composition (10.)+trimethylsiloxane-endblocked polymethylhydrogen siloxane. After heating at 350° C. for 25, 100, and 400 hours in sealed stainless steel tubes the above compositions of this invention experienced a smaller increase in cyclopolydimethylsiloxane formation than the control fluid. This demonstrates the increased thermal stability provided for the fluid in a closed system by the method of this invention. The results are summarized in Table II. Compositions (11.), (12.), and (13.) had a concentration of silicon-bonded hydrogen of 0.004 percent based on the weight used of composition (9.), (9.) and (10.) respectively.

TABLE II

| | Cyclopolydimethylsiloxane Formation at 350° C. (%) | | |
|---|---|---|---|
| Composition | 25 Hrs. | 100 Hrs. | 400 Hrs. |
| Control (10 mPa . s) | 3.46 | 8.52 | 17.57* |
| (9) | 0.98** | 1.49 | 2.63 |
| (10) | 0.76 | 1.45 | 2.57 |
| (11) | 0.28 | 1.17 | 4.04* |
| (12) | 0.53 | 0.57 | 1.19 |
| (13) | 0.28 | 1.17 | 4.04* |

*391.6 Hours
**27 Hours

EXAMPLE 5

The experiment of Example 4 was repeated with two trimethylsiloxane-endblocked polydimethylsiloxane fluids having viscosities of 20 and 50 mPa.s, respectively. A composition of this invention was prepared in each case as follows: (14.) 20 mPa.s fluid+0.75 percent of the zirconium octanoate additive of Example 1, (15.) Composition (14.)+trimethylsiloxane-endblocked polymethylhydrogen-siloxane, (16.) 50 mPa.s fluid+0.75 percent of the zirconium octanoate additive of Example 1, (17.) Composition (16.)+trimethylsiloxane-endblocked polymethylhydrogensiloxane. The results are summarized in Table III. Compositions (15.) and (17.) had a concentration of silicon-bonded hydrogen of 0.004 percent based on the weight used of compositions (14.) and (16.) respectively.

TABLE III

| Compositions | Cyclopolydimethylsiloxane Formation at 350° C. (%) | | |
|---|---|---|---|
| | 25 Hrs. | 100 Hrs. | 400 Hrs. |
| Control (20 mPa . s) | 3.61 | 10.06 | 23.22 |
| (14) | 1.23 | 1.98 | 3.59 |
| (15) | 0.42 | 0.34 | 0.81 |
| Control (50 mPa . s) | 5.55 | 13.56 | 22.55 |
| (16) | 1.83 | 2.98 | 4.41 |
| (17) | 0.14 | 0.23 | 0.51 |

EXAMPLE 6

A dynamic heat-transfer loop having a volume of approximately 60 liters and comprising an electric heater, fluid-to-water heat exchanger, fluid pump, nitrogen-purged, room-temperature expansion tank vented to the atmosphere through a 7 p.s.i.g. pressure relief valve, piping for conveying the heat transfer fluid between the heat source and the heat exchanger and associated control and monitoring components was filled with the control fluid of Example 4 as the heat-transfer fluid. The fluid was circulated under a nitrogen purge in the heat-transfer loop at 121° C. for 24 hours to dry and deoxygenate the fluid. The temperature of the fluid was then increased to 316° C. for 800 hours. The fluid was sampled after 25, 100, 400, and 800 hours and analyzed by G.L.C. as in Example 4 for cyclopolydimethylsiloxane content. The test was repeated with composition (9) of Example 4 as the heat-transfer fluid, instead of the control fluid, except that the test temperature was increased to 370° C. While the control fluid gained 0.74, 1.6, 3.3, and 4.2 percent cyclopolydimethylsiloxane at 25, 100, 400, and 800 hours, respectively the composition (9) of this invention gained only 0.47, 0.75, 1.15, and 1.6 percent cyclopolydimethylsiloxanes, respectively.

That which is claimed is:

1. In a heat-transfer system comprising a heat source, a heat exchange, a heat-transfer fluid and means for conveying the heat-transfer fluid between the heat source and the heat exchanger whereby heat is added to the heat-transfer fluid by the heat source and heat is at least partially removed from the heat-transfer fluid by the heat exchanger, the improvement comprising using as the heat-transfer fluid a methylpolysiloxane fluid having improved resistance to thermal siloxane rearrangement, said methylpolysiloxane fluid being prepared by a method comprising
(A) mixing components consisting essentially of
 (i) an endblocked methylpolysiloxane fluid having an average of from approximately 1.9 to less than 3.0 methyl groups per silicon, and
 (ii) an organometallic compound in sufficient amount to provide from 0.001 to 10.0 parts by weight of the metal per 100 parts by weight of the mixture of (i) plus (ii), said organometallic compound being selected from the group consisting of organotitanium, organozirconium and organohafnium compounds wherein each organic group consists of carbon, oxygen, and hydrogen atoms and which is bonded to the metal by at least one metal-oxygen-carbon linkage,
(B) heating the mixture of (i) plus (ii) in an inert atmosphere to decompose the organometallic compound,
(C) mixing with the mixture of (B)
 (iii) an amount of the endblocked methylpolysiloxane fluid (i), said amount being any amount, including none, which is sufficient to reduce the concentration of the metal to a value of from 0.001 to 0.1 parts by weight per 100 parts by weight of the mixture of (C), and
(D) mixing with the mixture of (C),
 (iv) an organosilicon hydride compound, soluble in (i) and bearing at least one silicon-bonded hydrogen atom per molecule, the amount of (iv) being from none to an amount sufficient to provide up to 0.05 parts by weight of silicon-bonded hydrogen atoms per 100 parts by weight of the mixture of (C) thereby providing a methylpolysiloxane fluid having an improved resistance to thermal siloxane rearrangement under anhydrous conditions, compared to the methylpolysiloxane (i).

2. In a heat-transfer system comprising a heat source, a heat exchanger, a heat-transfer fluid and means for conveying the heat-transfer fluid between the heat source and the heat exchanger whereby heat is added to heat-transfer fluid by the heat source and heat is at least partially removed from the heat-transfer fluid by the heat exchanger, the improvement comprising using as the heat-transfer fluid a methylpolysiloxane fluid having improved resistance to thermal siloxane rearrangement, said methylpolysiloxane being prepared by a method comprising mixing components consisting essentially of
(i) an endblocked methylpolysiloxane fluid having an average of from approximately 1.9 to less than 3.0 methyl groups per silicon,
(v) a siloxy-metal compound in sufficient amount to provide from 0.001 to 0.1 parts by weight of the metal per 100 parts by weight of the mixture of (i) plus (v), said siloxy-metal compound being selected from the group consisting of organosilicon compounds having at least one silicon-oxygen-titanium, silicon-oxygen-zirconium or silicon-oxygen-hafnium bond, and
(iv) an organosilicon hydride compound, soluble in (i) and bearing at least one silicon-bonded hydrogen atom per molecule, the amount of (iv) being from none to an amount sufficient to provide up to 0.05 parts by weight of silicon-bonded hydrogen atoms per 100 parts by weight of the mixture or (i) plus (v), thereby providing a methylpolysiloxane fluid having an improved resistance to thermal siloxane rearrangement under anhydrous conditions, compared to the methylpolysiloxane (i).

3. The improved heat-transfer system of claim 1 wherein the methylpolysiloxanes (i) and (iii) are trimethylsiloxane-endblocked polydimethylsiloxane fluids and the organometallic compound (ii) is a zirconium soap.

4. The improved heat-transfer system of claim 1 wherein the heat-transfer fluid has been prepared by a process comprising accomplishing the said heating step (B) in the heat-transfer system.

5. The improved heat-transfer system of claim 1 wherein the heat-transfer fluid has been prepared by a process comprising accomplishing the said heating step (B) outside of the heat-transfer system.

6. The improved heat-transfer system of claim 2 wherein the methylpolysiloxane (i) is a trimethylsiloxane-endblocked polydimethylsiloxane.

7. The heat-transfer system of claim 1 wherein the heat source is a means for collecting radiant energy from the sun.

8. The heat-transfer system of claim 2 wherein the heat source is a means for collecting radiant energy from the sun.

* * * * *

UNITED STATES PATENT AND TRADEMARK OFFICE
CERTIFICATE OF CORRECTION

PATENT NO. : 4,193,885
DATED : March 18, 1980
INVENTOR(S) : Roland L. Halm

It is certified that error appears in the above-identified patent and that said Letters Patent are hereby corrected as shown below:

In Column 3, line 13; the word reading "timethylsiloxane-" should read "trimethylsiloxane-".

In Column 3, line 53; the word reading "activated" should read "inactivated".

In Column 11, line 19; the line reading "weight of metal. However, the amount (iv) added" should read "weight of metal. However, the amount of (iv) added".

In Column 12, line 56; the word reading "effectivness" should read "effectiveness".

In Column 16, line 31; the line reading "source and the heat exchanger whereby heat is added to" should read "source and the heat exchanger whereby heat is added to the".

Signed and Sealed this

Sixth Day of October 198

[SEAL]

Attest:

GERALD J. MOSSINGHOFF

Attesting Officer         Commissioner of Patents and Trademarks